Patented Nov. 14, 1950

2,530,025

UNITED STATES PATENT OFFICE

2,530,025

QUINAZOLINE DERIVATIVES AND PROCESS OF MAKING SAME

Eduard Moergeli, Neuewelt, Paul Sutter, Binningen, and Walter Kern, Sissah, Switzerland, assignors to Ciba Limited, Basel, Switzerland, a Swiss firm No Drawing. Application June 24, 1947, Serial No. 756,808. In Switzerland July 9, 1946

9 Claims. (Cl. 260—251)

It is known that among quinazoline derivatives there are valuable intermediate products for the manufacture of dyestuffs (see U. S. Patent No. 2,187,812 and U. S. Patent No. 2,187,813). Hitherto, however, these quinazoline derivatives have been made by a troublesome process, which, moreover, in some cases necessitates the use of starting materials difficult to obtain.

According to the present invention quinazoline derivatives are made in a simple manner by treating an acylaminoanthraquinone-ortho-nitrile with an agent which is capable of replacing a hydroxyl group by halogen.

The acylaminoanthraquinone - ortho - nitriles used as starting materials are to a very great extent known, and may in part be obtained very easily by reaction of the corresponding acylamino-ortho-halogen-anthraquinone with cuprous cyanide by known methods. Thus, for example, 2-benzoylaminoanthraquinone-3-nitrile is easily obtainable from 2-benzoylamino-3-bromanthraquinone, which can be prepared, for example, by brominating 2-aminoanthraquinone and benzoylating the amino group.

The acyl residue in the aforesaid starting materials may be of aliphatic, heterocyclic or especially aromatic nature, for example, a benzoyl residue. As examples of such starting materials there may be mentioned 1-benzoylamino-anthraquinone - 2 - nitrile, 2 - (para - nitrobenzoylamino) -anthraquinone - 3 - nitrile, 2:6-di-(benzoylamino)-anthraquinone-3:7-dinitrile and, especially, the above named 2-benzoylamino-anthraquinone-3-nitrile.

As agents capable of replacing a hydroxyl group by halogen there come into consideration substances which are known to convert, for example, an acid into its corresponding acid halide. Especially suitable in this connection is the use of phosphorus pentachloride.

The reaction is advantageously conducted in an inert diluent or solvent, preferably of high boiling point, such as di- or tri-chlorobenzene and especially nitrobenzene. It is of advantage to increase the temperature rapidly and preferably above 100° C. e. g. to a temperature between 100° C. and 150° C. and allow the more volatile products to distil. The reaction may be brought to completion, by further heating, for example, at about 180° C. or at an even higher temperature.

The reaction may be formulated as follows:

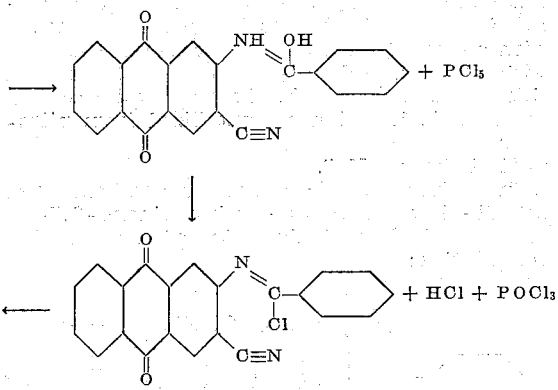

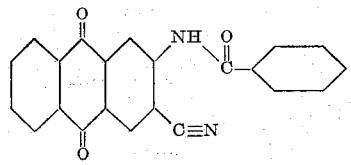

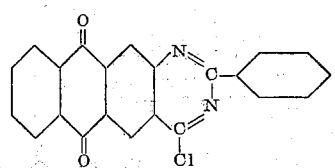

but we do not wish to be bound by any theory concerning the true course of the reaction.

The products obtained are quinazoline derivatives of the general formula

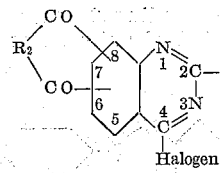

in which $R_1$ represents the residue originally present in the acyl group and

represents a phthaloyl residue attached at two of the positions from 5 to 8. These products are in part known, and are valuable intermediate products for the manufacture of dyestuffs.

New compounds containing the quinazoline residue at two positions in the molecule can be obtained by the present process by starting from anthraquinones which contain the ortho-acyl-amino-nitrile grouping at two places.

The following examples illustrate the invention, the parts being by weight:

Example 1

35.2 parts of 3-cyano-2-benzoylamino-anthraquinone (obtained by heating 3-bromo-2-benzoyl-aminoanthraquinone with cuprous cyanide and pyridine in benzene at 190° C.) and 23 parts of phosphorus pentachloride are heated in 250 parts of nitrobenzene first for ¼ hour at 110–130° C. and then for ¼ hour at 180–185° C. After cooling, the whole is filtered with suction, and the filter residue is washed first with nitrobenzene and then with benzene and dried. There is obtained in good yield 2-phenyl-4-chloro-6:7-phthaloyl-quinazoline of the formula

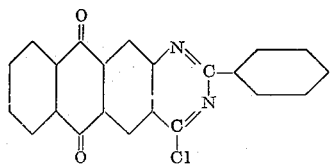

which melts at about 320° C.

Example 2

A mixture of 30 parts of 2-benzoylamino-anthraquinone-3-nitrile, 44.3 parts of phosphorus pentachloride and 410 parts of nitrobenzene are rapidly distilled to drive off 100 parts. The whole is then allowed to boil under reflux for 20 minutes. After cooling, the product formed is separated after a short time by filtration, washed with a small quantity of nitrobenzene and then with benzene, and dried. There is obtained in this manner a good yield of the product described in Example 1. When recrystallized from nitrobenzene it forms almost colorless prisms which melt at about 325° C.

In a similar manner there is obtained from 2:6-di-(benzoylamino)-anthraquinone-3:7-dinitrile a dichloro-diquinazoline of the following constitution:

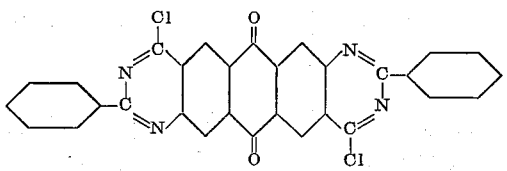

In a similar manner there is obtained from 2-(para-nitrobenzoylamino)-anthraquinone-3-nitrile the corresponding 2-(para-nitrophenyl)-4-chloro-6:7-phthaloyl-quinazoline of the formula

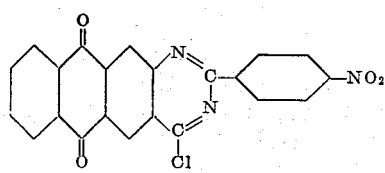

What we claim is:
1. Process for the manufacture of a quinazoline derivative which comprises reacting an acyl-amino-anthraquinone-orthonitrile with phosphorus pentachloride at elevated temperature, and recovering the said quinazoline derivative.

2. Process for the manufacture of a quinazoline derivative which comprises reacting a benzoyl-amino-anthraquinone-orthonitrile with phosphorus pentachloride at elevated temperature, and recovering the said quinazoline derivative.

3. Process for the manufacture of a quinazoline devirative which comprises reacting a 2-acyl-amino-anthraquinone-3-nitrile with phosphorus pentachloride at elevated temperature, and recovering the said quinazoline derivative.

4. Process for the manufacture of a quinazoline derivative which comprises reacting a 2-benzoyl-amino-anthraquinone-3-nitrile with phosphorus pentachloride at elevated temperature, and recovering the said quinazoline derivative.

5. Process for the manufacture of a quinazoline derivative which comprises rapidly heating a 2-benzoylamino-anthraquinone-3-nitrile with phosphorus pentachloride in an inert solvent to a temperature above 100° C., allowing volatile products to escape and heating further to terminate the reaction, and recovering the said quinazoline derivative.

6. Process for the manufacture of a quinazoline derivative which comprises rapidly heating 2-benzoylamino-anthraquinone-3-nitrile with phosphorus pentachloride in an inert solvent to a temperature above 100° C., allowing volatile products to escape and heating further to terminate the reaction, and recovering the said quinazoline derivative.

7. Process for the manufacture of a quinazoline derivative which comprises rapidly heating 2-(p-nitrobenzoyl)-amino-anthraquinone-3-nitrile with phosphorus pentachloride in an inert solvent to a temperature above 100° C., allowing volatile products to escape and heating further to terminate the reaction, and recovering the said quinazoline derivative.

8. Process for the manufacture of a quinazoline derivative which comprises rapidly heating 2:6-di-(benzoylamino)-anthraquinone-3:7-dinitrile with phosphorus pentachloride in an inert solvent to a temperature above 100° C., allowing volatile products to escape and heating further to terminate the reaction, and recovering the said quinazoline derivative.

9. As a new product the diquinazoline derivative of the formula

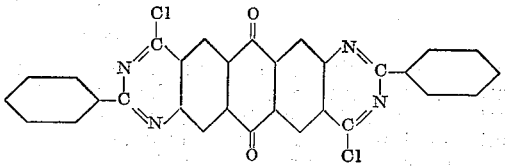

EDUARD MOERGELI.
PAUL SUTTER.
WALTER KERN.

REFERENCES CITED

The following references are of record in the file of this patent:

UNITED STATES PATENTS

| Number | Name | Date |
|---|---|---|
| 2,187,813 | Baumann et al. | Jan. 23, 1940 |

OTHER REFERENCES

Richter, Textbook of Organic Chemistry, pp. 205–206 (1928 edition).